(12) United States Patent
Robillot

(10) Patent No.: US 7,271,362 B2
(45) Date of Patent: Sep. 18, 2007

(54) PROTECTIVE COVERING FOR WELDING DEVICES

(75) Inventor: Alain Robillot, Eulmont (FR)

(73) Assignee: Atelier Systemes de Protection SAS, Eulmont (FR)

( * ) Notice: Subject to any disclaimer, the term of this patent is extended or adjusted under 35 U.S.C. 154(b) by 288 days.

(21) Appl. No.: 10/510,982

(22) PCT Filed: Apr. 14, 2003

(86) PCT No.: PCT/EP03/50105

§ 371 (c)(1),
(2), (4) Date: Oct. 13, 2004

(87) PCT Pub. No.: WO03/087685

PCT Pub. Date: Oct. 23, 2003

(65) Prior Publication Data

US 2005/0150872 A1   Jul. 14, 2005

(30) Foreign Application Priority Data

Apr. 15, 2002 (FR) .................................. 02 04763

(51) Int. Cl.
*B23K 11/36* (2006.01)
(52) U.S. Cl. ..................... 219/86.1; 219/138
(58) Field of Classification Search ............... 219/86.1, 219/86.25, 138
See application file for complete search history.

(56) References Cited

U.S. PATENT DOCUMENTS 2,337,767 A   12/1943   Paul
5,091,619 A   2/1992    Wall et al.

FOREIGN PATENT DOCUMENTS

| DE | 86 27 744 | 11/1986 |
| DE | 86 27 744 | 1/1987  |
| DE | 87 01 169 | 3/1987  |
| DE | 87 01 169 | 4/1987  |

*Primary Examiner*—Len Tran
(74) *Attorney, Agent, or Firm*—Westerman, Hattori, Daniels & Adrian, LLP.

(57) ABSTRACT

The invention relates to a protective covering for welding devices, in particular spot welding pliers, said covering being resistant to welding projections and being non-flammable. The inventive covering comprises a front panel and a rear panel which can be connected to each other by connecting means enabling the distance between the two panels to be adjusted, said panels being substantially planar and protecting the part of the device provided with welding pliers and the part opposite thereto, also comprising a tubular rim which is placed between the front and rear panels and which protects the part located between them, said rim consisting of several panels which are joined to each other in a detachable manner such that the rim corresponds substantially to the circumference of the welding device.

20 Claims, 2 Drawing Sheets

PROTECTIVE COVERING FOR WELDING DEVICES

The invention relates to a protective covering for welding devices, in particular spot welding pliers, this covering being resistant to welding projections and being non-flammable.

Welding devices, in particular spot welding pliers, have multiple pipes, electrical cables, and other elements that must be protected in the absence of a casing or lid. To this aim, protective coverings are conventionally used.

These coverings were initially in a supple and extensible material, which allowed them to be used for welding devices of different dimensions. However, this is very expensive and requires time for measurements taking, design, and fitting trials before the covering may be put in place and the welding device thus covered may be used.

Document U.S. Pat. No. 2,337,767-A discloses a covering designed to be placed on manual pliers designed to hold an object to be welded, in order to protect the operator's hand. Thus, this covering is not used to protect the welding device but the operator's hand.

The document DE 87 01 169-U discloses an enclosure in which are located a welding arm and the object to be welded. An extraction hood ensures a depression inside the enclosure so that the vapors and particles emitted during the welding operation are aspirated toward a filter. Thus, this enclosure is used to protect the personnel from potentially toxic emanations caused by the welding operation, but does not protect the welding arm itself.

Similarly, documents DE 86 27 744-U and U.S. Pat. No. 5,091,619-A disclose protection casings used to isolate the welding tool and the object to be welded from the outside environment, mainly to collect emanations caused by the welding operation in order to process them. Here also, no measure is taken in order to protect the welding apparatus itself.

Because of increased requirements relative to the resistance of the material forming the coverings, in particular resistance to welding projections and to fire, it has been necessary to resort to materials that are supple but not extensible, which necessitates that coverings must be made to measure in order to correspond at best to the dimensions of the welding device.

A goal of the invention is to create protective coverings for welding devices that resist to welding projections, are non-flammable, and that can be adapted to a large number of welding devices of different dimensions.

This goal is reached according to the invention by a covering which is constituted by, on the one hand, a front panel and a rear panel capable of being connected to each other by connecting means enabling the distance between the two panels to be adjusted, these panels being substantially planar and protecting the portion of the device equipped with welding arms and the portion opposed to the latter, and, on the other hand, a tubular rim to be disposed between the front and rear panels and protecting the portion located between them, this rim being constituted by several panels connected together in a detachable manner in order for the rim to correspond substantially to the circumference of the welding device.

This covering is placed on the welding device in two steps: the front and rear panels are first installed on the portion of the welding device equipped with arms and the portion opposed to the latter, and they are connected by connecting means. It is thus possible to protect a large number of different welding devices with relatively few elements of different sizes.

Once the front and rear of the device are protected, only the portion between the two panels remains to be protected. This protection is obtained by means of a tubular rim whose dimensions can be adapted to the circumference of the device by adding (or eliminating) one of the chained panels forming this rim. The advantage of the invention resides in that a covering in material that is resistant to welding projections and non-flammable can be quickly adjusted to the dimensions of the welding device. This avoids the drawbacks of coverings made to measure, in particular the relatively high cost and the relatively long manufacturing time. In addition, it is possible from now on to adapt relatively easily a covering that has served on a first device to use it on a second device.

In a variant of the invention, the front panel has openings to let the arms of spot welding pliers pass through. The distances between the arms of the spot welding pliers being standardized, it will be sufficient to design relatively few variants to be able to protect all types of devices. Further, it is possible to provide the openings in the panel only at the time of covering a device, and to adapt the openings to the distances between the arms at that time.

It is possible for the rear panel to be equipped with an opening to let the arm of a manipulator or a bundle of cables pass through. This enables the welding device to be manipulated by a robot that seizes it from behind, or simply provides a passage for cables or supply pipes.

In a particular embodiment of the invention, the front panel and/or the rear panel has a lateral portion that is capable of being at least partially covered by the rim or of covering the latter. This measure enables overlapping of the two portions of the covering in the area where they overlap, which improves the protection of the device.

According to another variant of the invention, the connecting means between the front and rear panels are straps equipped with fixation and adjustment elements. These means enable a fast and durable fixation of the two front and rear panels on the device.

Within the scope of the invention, it is advantageous if the connecting means between the front and rear panels are elastic straps. This can facilitate the positioning of the panels.

In a particular variant of the invention, the panels of the rim are connected by bands of the Velcro® type located on their lateral edges. This manner of fixing the panels makes it possible to add or remove one of the panels quickly and to ensure simultaneously a good strength of the rim.

It is also possible for the panels of the rim to be connected to each other at least at the extremities of their lateral edges by snap fasteners or latches. It is possible, on the one hand, to maintain the panels by means of latches or snap fasteners only, or, on the other hand, to combine latches and snap fasteners located at the extremities of the lateral edges of the panels with bands of the Velcro® type placed between the latches. In the latter version, the latches prevent the beginning of an opening of the bands of the Velcro® type.

The invention will be described below with reference to the following drawings showing an exemplary embodiment of the invention:

Figure 1:
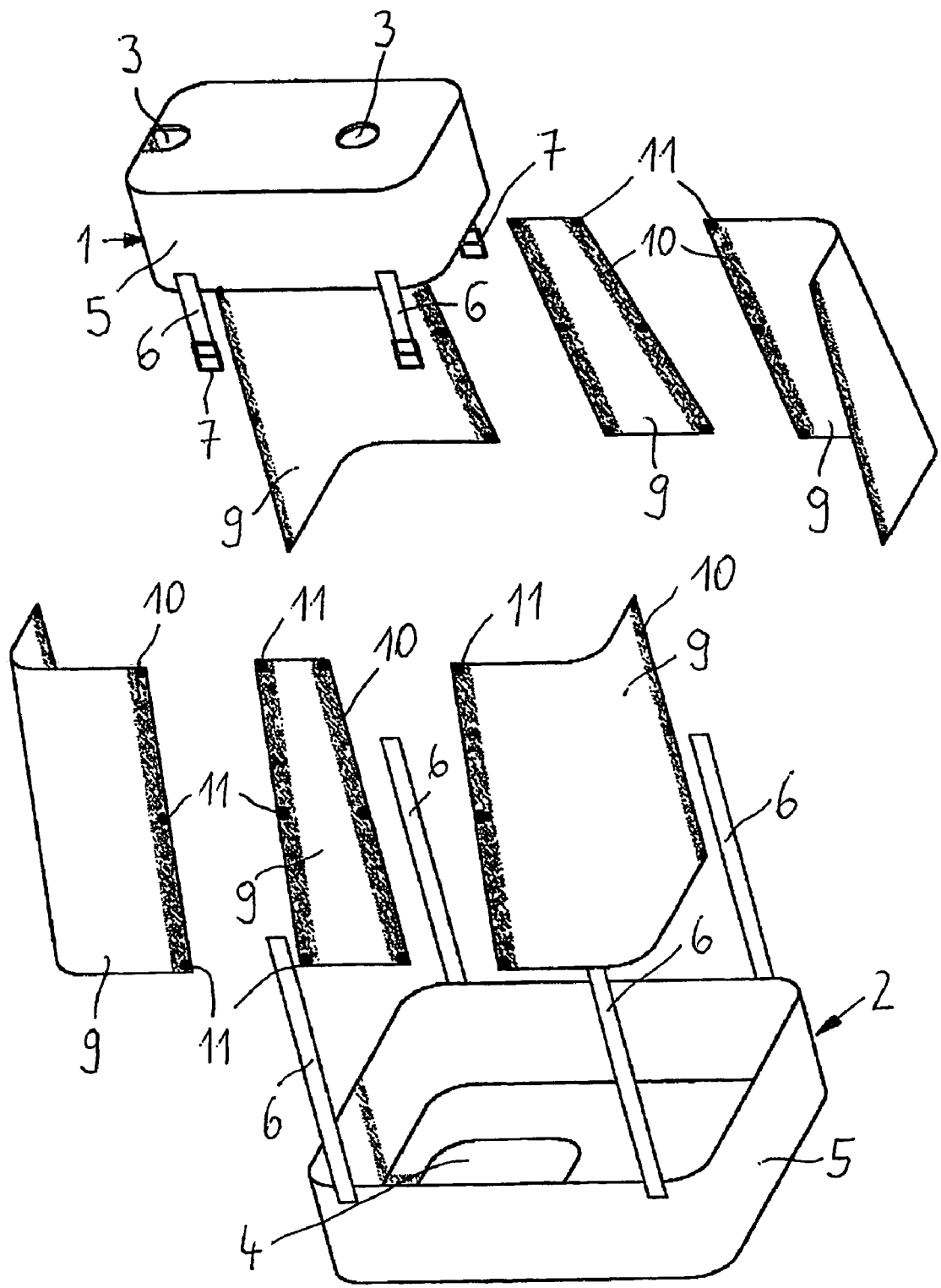
FIG. 1 is an exploded view of a covering according to the invention.
Figure 2A:
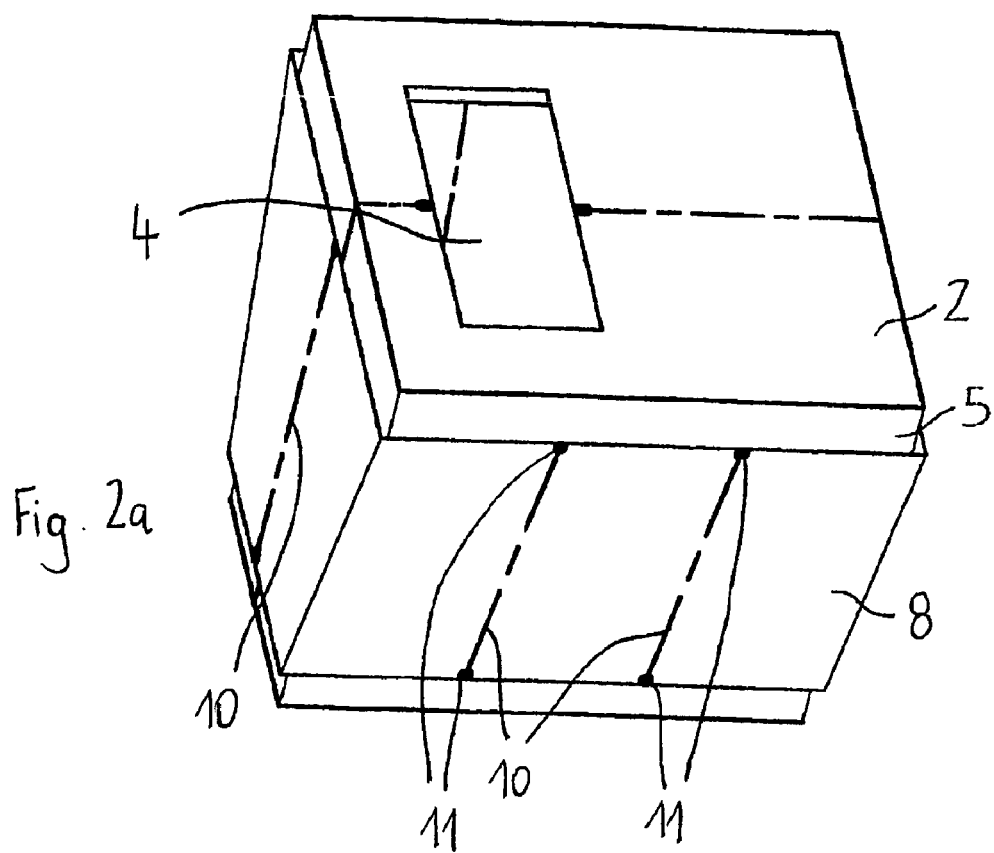
FIGS. 2a, 2b show a covering in the mounted state.
Figure 2B:
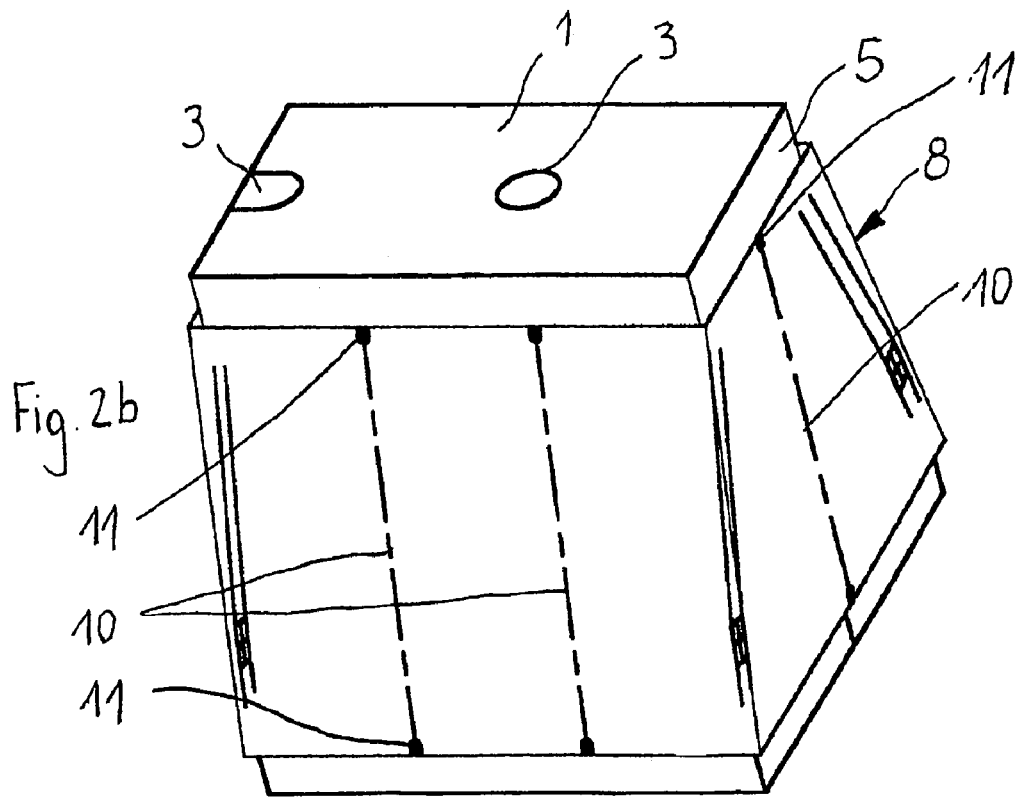

The covering according to the invention is composed of a front panel (1) and a rear panel (2) substantially flat which are placed in front of the front (with the arms) and rear portions of spot welding pliers. The front panel (1) has openings (3) to let the arms pass through, the rear panel (2)

has an opening (4) to let a robot arm pass through, by means of which the device will be manipulated. The openings (3) and (4) can be provided with elastic bands in order to obtain a better protection against the projections. The front (1) and rear (2) panels are each equipped with a lateral edge (5), the lateral edges (5) of the front (1) and rear (2) panels being oriented toward each other. In the illustrated example, four pairs of straps (6) make it possible to connect the front panel (1) and the rear panel (2) with each other. Fixation and adjustment elements (7) are provided on each of these pairs of straps (6).

Between the front (1) and rear (2) panels is placed a tubular rim (8) which is composed of panels (9) connected laterally with each other so that the rim has substantially the circumference of the device to be covered. To this aim, it is possible to add or to remove panels (9), the panels (9) being fixed one to another only by means of bands of the Velcro® type (10) and of latches (11), the latter being placed in particular at the extremities to avoid the beginning of an opening of the band of the Velcro® type (10).

In this manner, it is possible to cover in little time a welding device with a pre-manufactured covering which can be cut in a non-flammable material and is resistant to welding projections while being generally supple but not extensible.

LIST OF REFERENCES 1 front panel
2 rear panel
3 openings for the arms
4 opening for the robot arm
5 lateral edge
6 pair of straps
7 fixation means of the pairs of straps
8 tubular rim
9 lateral panels
10 bands of the Velcro® type
11 latches

The invention claimed is:

1. Protective covering for welding devices, in particular spot welding pliers, said covering being resistant to welding projections and being non-flammable, wherein the covering comprises:
    a front panel,
    a rear panel,
    connecting means, wherein the front panel and the rear panel are capable of being connected to each other by the connecting means enabling the distance between the two panels to be adjusted, these panels being substantially planar and protecting the portion of the device equipped with welding pliers and the portion opposed to the latter, and
    a tubular rim to be disposed between the front and rear panels and protecting the portion located between them, this rim being constituted by several panels connected together in an individually and completely detachable manner in order for the rim to correspond at best to the circumference of the welding device.

2. Protective covering according to claim 1, wherein the front panel has openings to let the arms of spot welding pliers pass through.

3. Protective covering according to claim 1, wherein the rear panel is equipped with an opening to let the arm of a manipulator or a bundle of cables pass through.

4. Protective covering according to claim 1, wherein the front panel and/or the rear panel has a lateral portion capable of being at least partially covered by the rim or of covering the latter.

5. Protective covering according to claim 1, wherein the connecting means between the front and rear panels are straps equipped with fixation and adjustment means.

6. Protective covering according to claim 1, wherein the connecting means between the front and rear panels are elastic straps.

7. Protective covering according to claim 1, wherein the panels of the rim are connected to each other by bands of the Velcro® type located on their lateral edges.

8. Protective covering according to claim 1, wherein the panels of the rim are connected to each other at least at the extremities of their lateral edges by snap fasteners or latches.

9. Protective covering according to claim 2, wherein the rear panel is equipped with an opening to let the arm of a manipulator or a bundle of cables pass through.

10. Protective covering for welding devices, in particular spot welding pliers, said covering being resistant to welding projections and being non-flammable, wherein the covering comprises:
    a front panel,
    a rear panel,
    connecting means, wherein the front panel and the rear panel are capable of being connected to each other by the connecting means enabling the distance between the two panels to be adjusted, these panels being substantially planar and protecting the portion of the device equipped with welding pliers and the portion opposed to the latter, and
    a tubular rim to be disposed between the front and rear panels and protecting the portion located between them, this rim being constituted by several panels connected together in a detachable manner in order for the rim to correspond at best to the circumference of the welding device,
    wherein the front panel has openings to let the arms of spot welding pliers pass through.

11. Protective covering according to claim 10, wherein the rear panel is equipped with an opening to let the arm of a manipulator or a bundle of cables pass through.

12. Protective covering according to claim 10, wherein the front panel and/or the rear panel has a lateral portion capable of being at least partially covered by the rim or of covering the latter.

13. Protective covering according to claim 10, wherein the connecting means between the front and rear panels are straps equipped with fixation and adjustment means.

14. Protective covering according to claim 10, wherein the connecting means between the front and rear panels are elastic straps.

15. Protective covering according to claim 10, wherein the panels of the rim are connected to each other at least at the extremities of their lateral edges by snap fasteners or latches.

16. Protective covering for welding devices, in particular spot welding pliers, said covering being resistant to welding projections and being non-flammable, wherein the covering comprises:
    a front panel,
    a rear panel,
    connecting means, wherein the front panel and the rear panel are capable of being connected to each other by the connecting means enabling the distance between the two panels to be adjusted, these panels being substantially planar and protecting the portion of the device equipped with welding pliers and the portion opposed to the latter, and a tubular rim to be disposed between the front and rear panels and protecting the portion located between them, this rim being constituted by several panels connected together in a detachable manner in order for the rim to correspond at best to the circumference of the welding device, wherein the rear panel is equipped with an opening to let the arm of a manipulator or a bundle of cables pass through.

17. Protective covering according to claim 16, wherein the front panel and/or the rear panel has a lateral portion capable of being at least partially covered by the rim or of covering the latter.

18. Protective covering according to claim 16, wherein the connecting means between the front and rear panels are straps equipped with fixation and adjustment means.

19. Protective covering according to claim 16, wherein the connecting means between the front and rear panels are elastic straps.

20. Protective covering according to claim 16, wherein the panels of the rim are connected to each other at least at the extremities of their lateral edges by snap fasteners or latches.

* * * * *